(12) United States Patent
Mabey et al.

(10) Patent No.: US 7,482,395 B2
(45) Date of Patent: Jan. 27, 2009

(54) INTUMESCENT FIRE RETARDANT LATEX PAINT WITH MOLD INHIBITOR

(75) Inventors: Michael John Mabey, Sherwood Park (CA); William Kish, Wadsworth, OH (US)

(73) Assignee: No-Burn Investments, L.L.C., Wadsworth, OH (US)

( * ) Notice: Subject to any disclaimer, the term of this patent is extended or adjusted under 35 U.S.C. 154(b) by 329 days.

(21) Appl. No.: 11/320,207

(22) Filed: Dec. 28, 2005

(65) Prior Publication Data
US 2006/0167131 A1 Jul. 27, 2006

Related U.S. Application Data

(60) Provisional application No. 60/646,245, filed on Jan. 24, 2005.

(51) Int. Cl.
*C09D 5/16* (2006.01)
*C09K 21/14* (2006.01)

(52) U.S. Cl. .................................... 523/122; 523/179
(58) Field of Classification Search ............... 523/122, 523/179
See application file for complete search history.

(56) References Cited

U.S. PATENT DOCUMENTS

| | | | |
|---|---|---|---|
| 3,196,108 A | 7/1965 | Nelson | 252/2 |
| 3,257,316 A | 6/1966 | Langguth et al. | 252/2 |
| 3,309,324 A | 3/1967 | Langguth et al. | 252/387 |
| 3,513,114 A | 5/1970 | Vandersall et al. | 523/179 |
| 3,634,234 A | 1/1972 | Morgenthaler | 252/7 |
| 3,730,890 A | 5/1973 | Nelson | 252/7 |
| 3,934,066 A | 1/1976 | Murch | 428/248 |
| 3,955,987 A | 5/1976 | Schaar et al. | 106/15 FP |
| 3,955,997 A * | 5/1976 | Sagane et al. | 524/24 |
| 3,960,735 A | 6/1976 | Lacey | 252/7 |
| 3,969,291 A | 7/1976 | Fukuba et al. | 523/179 |
| 4,028,333 A | 6/1977 | Lindvay | 260/45.8 NT |
| 4,137,849 A | 2/1979 | Hontgas et al. | 102/56 R |
| 4,166,840 A | 9/1979 | Chapman | 423/313 |
| 4,201,593 A | 5/1980 | Sienkowski et al. | 106/18.14 |
| 4,201,677 A | 5/1980 | Shukla et al. | 252/8.1 |
| 4,205,022 A | 5/1980 | Nicholson et al. | 260/953 |
| 4,210,452 A | 7/1980 | Nicholson et al. | 106/18.18 |
| 4,216,261 A | 8/1980 | Dias | 442/84 |
| 4,221,837 A | 9/1980 | Nicholson et al. | 428/288 |
| 4,226,907 A | 10/1980 | Sienkowski et al. | 428/288 |
| 4,241,145 A | 12/1980 | Shukla | 428/537 |
| 4,265,791 A | 5/1981 | Nicholson et al. | 252/8.1 |
| 4,339,357 A | 7/1982 | Nicholson et al. | 252/606 |
| 4,345,002 A | 8/1982 | Smith et al. | 428/288 |
| 4,365,025 A | 12/1982 | Murch et al. | 521/159 |
| 4,447,336 A | 5/1984 | Vandersall | 252/7 |
| 4,447,337 A | 5/1984 | Adl et al. | 252/7 |
| 4,588,510 A | 5/1986 | Salyer et al. | 252/5 |
| 4,595,414 A | 6/1986 | Shutt | 106/18.16 |
| 4,606,831 A | 8/1986 | Kegler et al. | 252/7 |
| 4,632,813 A | 12/1986 | Anastasi et al. | 423/310 |
| 4,668,710 A | 5/1987 | Pawloski et al. | 521/171 |
| 4,686,241 A | 8/1987 | Pawloski et al. | 521/107 |
| 4,744,965 A | 5/1988 | Fairchild | 423/310 |
| 4,816,186 A | 3/1989 | Acitelli | 252/610 |
| 4,822,524 A | 4/1989 | Strickland | 252/603 |
| 4,839,065 A | 6/1989 | Vandersall | 252/603 |
| 4,983,326 A | 1/1991 | Vandersall | 252/603 |
| 5,064,710 A | 11/1991 | Gosz | 428/182 |
| 5,165,904 A | 11/1992 | Staffel et al. | 423/305 |
| 5,246,652 A | 9/1993 | Hsu et al. | 264/109 |
| 5,332,765 A * | 7/1994 | Lorentzen et al. | 523/122 |
| 5,399,375 A * | 3/1995 | Rood | 427/203 |
| 5,462,699 A | 10/1995 | Montgomery | 252/609 |
| 5,603,990 A | 2/1997 | McGinniss et al. | 427/393.3 |
| 5,626,787 A | 5/1997 | Porter | 252/4 |
| 5,645,926 A | 7/1997 | Horrocks et al. | 442/234 |
| 5,702,768 A * | 12/1997 | Orr | 427/236 |
| 5,730,907 A * | 3/1998 | Schultz et al. | 252/400.62 |
| 5,882,541 A | 3/1999 | Achtmann | 252/8.05 |

(Continued)

OTHER PUBLICATIONS

Environmental Working Group, Chemical Industry Archives, "3M and Scotchgard: 'Heroes of Chemistry' or a year coverup?" p. 1 (www.chemicalindustryarchives.org/dirty secrets/scotchgard/1.asp) downloaded Jan. 31, 2006.

(Continued)

*Primary Examiner*—Kriellion A Sanders
(74) *Attorney, Agent, or Firm*—Christopher John Rudy

(57) ABSTRACT

Intumescent fire retardant latex paint has a mold inhibitor in an amount sufficient to kill, control, or prevent growth of mold, mildew or fungus after the intumescent fire retardant latex paint having mold inhibitor is applied to, and dried and reached a constant mass on a substrate. The paint can be in a form of a finish paint or primer. For example, the mold may be toxic black mold (*Stachybotrys chartarum*), and the mold inhibitor may be alkyldimethylbenzylammonium chloride as an 80% by weight mixture added at about 3% by weight of a base fire retardant latex paint formulation. Such a paint can be made by contacting latex paint-forming ingredients with a fire retardant and a mold inhibitor, under conditions sufficient to form the paint; and can be used by contacting it with a substrate under conditions sufficient to be flame retardant or mold inhibitory, or both. An article of manufacture can include, in combination, the paint having the mold inhibitor, or its residue, and the substrate.

20 Claims, No Drawings

U.S. PATENT DOCUMENTS

| | | | | |
|---|---|---|---|---|
| 5,882,550 | A | 3/1999 | Regan | 252/609 |
| 5,912,003 | A | 6/1999 | Chang | 424/405 |
| 5,925,457 | A | 7/1999 | McGinniss et al. | 428/341 |
| 5,931,994 | A | 8/1999 | Mateo Herrero | 106/15.05 |
| 5,968,669 | A | 10/1999 | Liu et al. | 428/537.1 |
| 5,989,706 | A | 11/1999 | McGinniss et al. | 428/341 |
| 5,997,758 | A | 12/1999 | Barbarin et al. | 252/3 |
| 6,001,285 | A | 12/1999 | Wunram | 252/606 |
| 6,025,027 | A | 2/2000 | Shutt | 427/337 |
| 6,084,008 | A | 7/2000 | Liu | 523/179 |
| 6,130,267 | A | 10/2000 | Dueber et al. | 521/128 |
| 6,162,375 | A | 12/2000 | Crouch et al. | 252/603 |
| 6,207,085 | B1 | 3/2001 | Ackerman | 252/606 |
| 6,632,442 | B1 * | 10/2003 | Chyall et al. | 424/400 |
| 6,881,248 | B2 | 4/2005 | Lee et al. | 106/18.32 |
| 6,982,049 | B1 | 1/2006 | Mabey et al. | 252/606 |
| 6,989,113 | B1 | 1/2006 | Mabey | 252/606 |
| 2005/0022466 | A1 | 2/2005 | Kish et al. | 52/741.3 |
| 2005/0039635 | A1 * | 2/2005 | Yang et al. | 106/31.89 |
| 2005/0138888 | A1 | 6/2005 | Kish et al. | 52/741.3 |
| 2006/0189232 | A1 | 8/2006 | Kish et al. | 442/59 |

OTHER PUBLICATIONS

Kish, Wm., U.S. Appl. No. 11/654,431, Jan. 17, 2007.
Kish, Wm., U.S. Appl. No. 11/654,467, Jan. 17, 2007.
Mabey et al., U.S. Appl. No. 11/654,486, Jan. 17, 2007.
Mabey et al., U.S. Appl. No. 11/654,487, Jan. 17, 2007.
Mason Chemical Co., "MAQUAT 2.5-M," May 1, 2002.
Mason Chemical Co., MSDS Mason CS428, Jan. 2003 A. D.
Mohawk Finishing Products, Mohawk Finishing Search Results, fabric guard AND Mohawk Site (search.atomz.com/search/...); Mohawk-Finishing.com, home; Fabric Guard (Reg. U.S. Pat. & Tm. Off.) Product Data Sheet; Fabric Guard Material Safety Data Sheet; Fabricsafe Aerosol Material Safety Data Sheet (www.mohawk-finishing.com/...) downloaded Feb. 4, 2004.
3M Home Care Division, SCOTCHGARD (TM), fabric protector, trade dress, aerosol can, 2002 A. D.
3M Worldwide, scotchguard from 3m.com, Patsy Sherman and the discovery of Scotchgard (TM) Fabric Protector (www.3m.com/about3M/pioneers/sherman.jhtml) downloaded Jan. 31, 2006.
3M Worldwide, Scotchgard (TM) Protector, home; Scotchgard (TM) Protector Carpet Care; Scotchgard (TM) Furniture Care—Do-It-Yourself Products—Fabric Protector; Scotchgard (TM) Protector Outdoor Care (www.3m.com/us/home_liesure/scotchgard/...) downloaded Jan. 30, 2006.
International Fireproof Technology, Inc., PTB DC-333 fire retardant latex paint with black mold inhibitor, web site materials (www.painttoprotect.com/...) downloaded Oct. 31, 2006.
Frelo Technology, LLC, HomeGuard fire retardant with mold inhibitor, web site materials (www.frelo.com/...) downloaded Nov. 7, 2006.
Mason Chemical Co., MSDS Mason CS428, Jan. 2003 A.D.
Mason Chemical Co., "MAQUAT 2.5-M," May 1, 2002.
Farrell et al., *Environmental Toxicology and Chemistry*, abstract for vol. 17, No. 8, pp. 1552-1557, 1998.
KIA Inc., Kemco International Associates Biocides (www.kemcointernational.com/Biocides.htm) downloaded Dec. 16, 2004.
The Cary Company, web site Home Page, Products and Flame Retardants & Smoke Suppressant Additives web site pages (www.thecarycompany.com/Home.html) (www.thecarycompany.com/products1.html) (www.thecarycompany.com/products/Kemgard.html) downloaded Dec. 16, 2004.
Verichem Inc., web site information and product line pages (www.verichem.org/pages/5/page5.html?refresh=1079996004846) (www.verichem.org/pages/3/page3.html?refresh=1079996005142) (www.verichem.org/pages/2/page2/html?refresh=1079996005008) downloaded Dec. 21, 2004.
Mabey, U.S. Appl. No. 10/132,958 filed Apr. 26, 2002 A.D.
Mabey et al., U.S. Appl. No. 11/002,730 filed Dec. 2, 2004 A.D.
Kish et al., U.S. Appl. No. 60/656,148 filed Feb. 23, 2005 A.D.
Kish et al., U.S. Appl. No. 60/670,121, filed Apr. 11, 2005 A.D.
Mabey et al., U.S. Appl. No. 60/464,245, filed Jan. 24, 2005 A.D.
Arch Chemicals, ARCH Wood Treated Right, home page with screen print and DRICON FRT Wood: Product Properties (www.archchemicals.com) downloaded Jun. 19, 2008.
Biewer Lumber, DRICON indoor wood, home page and MSDS, plus Product Data 1998 Hickson Corporation (www.biewerlumber.com) downloaded Jun. 19, 2008.
Bluwood, U.S. Tm. Reg. No. 3,269,118 (Jul. 24, 2007), Latest Status Info by TARR system (tarr.uspto.gov) downloaded Jul. 29, 2008.
Daines, "BluWood stands out on Headlands," The Orange County Register, Local, pp. 8+, Jul. 16, 2008.
IDollarStore, "What is MDF, Medium-density fiberboard," p. 1 of 2 (www.idollarstore.com/what_is_mdf.htm) downloaded May 29, 2008.
U.S. Tm. Reg. No. 3,056,604 (Jan. 31, 2006).

* cited by examiner

INTUMESCENT FIRE RETARDANT LATEX PAINT WITH MOLD INHIBITOR

This claims the benefits accorded by 35 USC 119(e) of provisional No. 60/646,245 filed on Jan. 24, 2005 A.D. The complete specification of that '245 application is incorporated herein by reference.

FIELD AND PURVIEW OF THE INVENTION

The invention concerns an intumescent fire retardant latex paint with a mold inhibitor, methods to make and use it, and a substrate combined with the composition or residue thereof.

BACKGROUND TO THE INVENTION

Various fire retardant compositions are known. Certain of these can be in a form of an intumescent composition, coating or paint. Note, U.S. Pat. Nos. 5,989,706; 5,925,457; 5,645,926; 5,603,990; 5,064,710; 4,635,025; 4,345,002; 4,339,357; 4,265,791; 4,241,145; 4,226,907; 4,221,837; 4,210,452; 4,205,022; 4,201,677; 4,201,593; 4,137,849; 4,028,333; 3,955,987 and 3,934,066. The intumescent fire retardant may be associated with latex. Note, the latter two ('987 and '066) patents. Various organizations, for example, the Cary Company, Addison, Ill., U.S.A., Kemco International Associates, St. Pete, Fla., U.S.A., and Verichem, Inc., Pittsburgh, Pa., U.S.A., may make available certain components for certain paints and coatings including flame retardant and smoke suppressant additives, and certain biocides. A highly effective fire retardant intumescent latex paint, NO-BURN (Reg. U.S. Pat. & Tm. Off) PLUS, is commercially available from NO-BURN, INC., Wadsworth, Ohio, U.S.A., which can be employed, for example, in homes and commercial structures, to provide fire resistant properties to the structure. See, certain parts of U.S. patent application publications by Kish et al., Pub. Nos. 2005/0022466 A1 and 2005/0138888 A1. Compare, U.S. patent application Ser. No. 10/132,958 by Mabey and Ser. No. 11/002,730 by Mabey et al., both of which relate to ammonium phosphate containing fire retardant coatings preferably for interior woodwork, the latter of which includes a mold inhibitor, each preferably embodied as WOOD GARD and WOOD GARD MIH liquids available from NO-BURN, INC.

Various other fire retardant art is known. See, e.g., U.S. Pat. Nos. 6,207,085; 5,997,758; 5,882,541; 5,626,787; 5,165,904; 4,744,965; 4,632,813; 4,595,414; 4,588,510; 4,216,261; 4,166,840; 3,969,291 and 3,513,114.

FULL DISCLOSURE OF THE INVENTION

I. Objects

It is a general object to improve upon the art.

It is a particular object and desire to provide mold-inhibition to a fire retardant, notably for an intumescent latex paint formulation such as NO-BURN PLUS, while retaining desirable properties of the composition. It is an especially desirable object to provide for control of toxic black mold (*Stachybotrys chartarum*), a problematic mold of serious concern, on the surface of materials that are coated with the fire retardant latex paint composition.

These and other objects are satisfied, at least in part, by the present invention.

II. Provisions

In general, provided is an intumescent fire retardant latex paint having a mold inhibitor. The paint can be in a form of a finish paint or primer. Such a paint can be made by contacting latex paint-forming ingredients with a fire retardant and a mold inhibitor, under conditions sufficient to form the paint; and can be used by contacting it with a substrate, which beneficially is otherwise a flammable substrate, under conditions sufficient to be flame retardant or mold inhibitory, or both. Another aspect is an article of manufacture comprising, in combination, the paint having the mold inhibitor, or a residue of the same; and the substrate.

The invention is useful in retarding fire and controlling mold and so forth fauna.

Significantly, by the invention, an effective, cost-efficient, aesthetically pleasing and/or generally safe fire retardant having mold inhibition is provided. The invention ameliorates or solves one or more of the problems in the art. For instance, flammable construction stock such as wooden board stock is provided with good fire retardant ratings and effective mold control; and, in addition to fire retardancy, mold inhibition can be provided by the paint to paper or paper-coated wallboard products including gypsum core, paper-coated wallboard. Application of the paint is simple and easy, and coverage can be excellent. A particular embodiment provides for control of toxic black mold in a fire retardant. Addition of the mold inhibitor adds notable value to the fire retardant. The paint of the invention can advantageously be applied directly to a wide range of materials, including wood, plywood, oriented strand board and chip board sheathing, paper, fabrics, corrugated board materials, and so forth and the like. The composition is moderately inexpensive and reasonably safe to manufacture, store, transport and use. One of the many advantages of the present composition is that, since it can be applied directly to materials, this greatly reduces the financial and environmental costs of rendering materials fire retardant. Further, building materials may be rendered fire retardant during or after construction by direct application of the present composition, which may eliminate much cost and difficulty in building construction. Application to inside substrates is particularly beneficial. The composition may be considered to be an intumescent fire retardant/mold inhibitor latex paint. The paint of the invention can have a "Class A" fire rating. Embodiments of the invention can be considered improvements in kind the NO-BURN PLUS intumescent fire retardant latex paint, adding to such, in particular, exceptional value and utility, noting along these lines salient parts of the aforementioned Kish et al. publications.

Numerous further advantages attend the invention.

The invention can be further understood by the additional detail set forth below. The same, like that set forth above, is to be taken in an illustrative and not necessarily limiting sense.

Broadly, an intumescent fire retardant latex paint is combined with a mold inhibitor.

A foundation of preferred embodiments of the invention is that an intumescent fire retardant latex paint base can be prepared, and during or after its preparation can be added the mold inhibitor. The mold inhibitor, for example, may be added to the base immediately upon its manufacture. Conditions are those sufficient to form the fire retardant paint with mold inhibitor of the invention. Stirring or other agitation of the present paint can enhance its uniformity.

The term, "fire retardant paint," as employed herein is a latex composition that, when applied to a flammable material, provides thermal protection for the material. In general, this may be done by reducing or perhaps even eliminating the tendency of the material to burn and/or reducing the rate of flame spread along the surface of the material. Preferably, use of the fire retardant paint, for example, on a solid material as the substrate, reduces surface burning characteristics significantly, say, at least about 10%, at least about 25%, or at least about 50%, when compared to untreated material, as tested by an appropriate test. For example, the test may be the ASTM E84 Steiner Tunnel Test. Without being bound by any theory, the preferred fire retardant paint of the present invention, based in general on the Form #2 fire retardant paint of the aforementioned Kish et al. publications, more preferably the NO-BURN PLUS paint, can be considered to be an intumescent fire reactant. Although it looks and applies like regular paint, its chemical composition changes drastically when introduced to heat. Thus, when heat is applied, the fire retardant paint of the invention may "foam up" to form an intact, fire-resistive "char-barrier" to protect the treated surface. As a result, fire is robbed of fuel and oxygen, generates less heat and smoke, and may in some circumstances extinguish itself. Fire retardant paint formulations can vary, but may include ingredients added with water such as follows in approximate percentages:

| | |
|---|---|
| Ammonium phosphate solids | 15~30% by weight |
| Thermoplastic latex resin, e.g., polyvinyl acetate type | 10~30% by weight |
| Nitrogenous spumific, e.g., melamine powder | 7~13% by weight |
| Carbonific, e.g., polyol | 7~13% by weight |
| Titanium dioxide and/or other inert inorganic opacifying agent | 5~10% by weight |
| Soda lime borosilicate or other glass | 1~5% by weight |
| Ester alcohol | 0.5~1.5% by weight |
| Hydroxyalkylcellulosic | 0.1~1% by weight |
| Wetting and/or other agent(s) | 0.1~2% by weight. |

A more particular base intumescent fire retardant latex paint formulation follows:

| | |
|---|---|
| Water (bulk) | 25~33% by weight |
| Ammonium polyphosphate powder | 20~21% by weight |
| Vinyl acetate latex (aqueous) | 21~22% by weight |
| Melamine powder | 9~10% by weight |
| Pentaerythritol | 8.5~9.5% by weight |
| Titanium dioxide powder | 7~8% by weight |
| Glass bubbles (0.12~0.63 g/cc) | 1~2% by weight |
| 2,2,4-trimethyl-1,3-pentanediol monoisubutyrate | 0.6~0.8% by weight |
| Hydroxyethylcellulose | 0.2~0.4% by weight |
| Wetting and/or other agents | ~1% by weight. |

To such a base fire retardant latex paint formulation or any other suitable fire retardant latex paint formulation, or precursor part thereof, is provided the mold inhibitor in any suitable amount. The mold inhibitor may be added in an amount by weight of base fire retardant latex paint formulation, independently at each occurrence, about from 0.1% to 15%, to include about from 0.5% to 10%, about from 1% to 5%, and about from 2% to 4%. For instance, the mold inhibitor may be added at about 3% by weight of the base fire retardant latex paint formulation.

As the ammonium phosphate, any suitable ammonium phosphate salt, to include ammonium polyphosphates, and mixtures thereof, may be employed. Advantageously, it is a solid, which may be provided as a powder. Such a salt may be a mixture which contains monoammonium and diammonium phosphates. Such a salt may be commercially obtained.

As the thermoplastic latex resin such as a polyvinyl acetate latex, any suitable polyvinyl acetate latex type polymer, copolymer or mixture thereof, or the like, may be employed. The polyvinyl acetate type latex component may be provided as an aqueous emulsion. Also, other thermoplastic latex resins that may function in this capacity would include such resins as polyvinyledene chloride resins and so forth and the like, although perhaps not functioning as effectively as the preferred vinyl acetates.

As the nitrogenous spumific, any suitable hydrogen-containing nitrogenous organic compound may be employed. Preferably, the spumific is compatible with the other components employed, and further is dispersible therewith. For instance, melamine may be employed.

As the carbonific, any suitable hydroxyl-containing organic compound may be employed. Preferably, the carbonific is compatible with the other components employed, and further is soluble or dispersible in the water or other diluent employed. For instance, a polyol may be employed. The polyol may be a compound such as glycerol, pentaerythritol, dipentaerythritol, tripentaerythritol; a sugar, say, a monosaccharide such as a triose, tetrose, pentose, hexose, heptose, or octose, to include an aldose or a ketose, or a disaccharide, a trisaccharide, a polysaccharide, and so forth; and/or a starch. A combination of polyols may be employed. Pentaerythritol is a preferred selection.

As the opacifying agent, titanium dioxide powder is preferred. Although pure titanium dioxide powder may be employed, more commonly it is employed in a grade that contains other inert inorganic substances, for example, aluminum hydroxide and/or amorphous silica. An opacifying agent such as titanium dioxide can be employed in an aqueous dispersion form.

A glass additive such as borosilicate and/or other glass may be provided, preferably in the form of glass bubbles of a size in the range of a powder. This improves the body of the paint and may provide it with thixotropic or other advantageous viscous flow properties.

As the ester alcohol, any suitable ester alcohol may be employed. The ester alcohol may be an alkanol alkylate, for example, 2,2,4-trimethyl-1,3-pentanediol monoisubutyrate. The ester alcohol functions as a coalescent for film integrity, and so forth.

As the hydroxyalkylcellulosic, any hydroxyalkylcellulose or suitable analog or derivative thereof may be employed. It may be hydroxymethylcellulose or hydroyethylcellulose, preferably the latter. The hydroxyalkylcellulosic functions to improve the flow and rheology of the finished paint solution or suspension, reducing sag and improving film build.

Wetting and/or other agent(s) may be employed. Such agent(s) can include what may be considered surface tension lowering agents, surfactants, defoaming agents, dispersing agents, paint preservatives, which may be biocidal, and so forth and the like. Thus employed in minor amounts may be a pigment dispersing agent such as an alkali metal salt of a polymeric carboxylic acid, say, the sodium salt of a copolymer of maleic acid; a defoamer colloid such as an acrylic polymer, say, sodium polyacrylate; a silicone surfactant such as a polyether modified alkyl polysiloxane, say, a polyether modified poly-dimethyl-siloxane, which may be employed neat or preferably in solution with a suitable solvent, say, about half dipropyleneglycol monomethyl ether (48%); a paint preservative/biocide such as containing 1,2-benzisothiazol-3(2H)-one, say, as an aqueous mixture containing 1,2-benzisothiazol-3(2H)-one, sodium hydroxide, and dipropyleneglycol; and a rheology modifier such as a hydrophobically modified ethylene oxide urethane block copolymer, which may be employed in an organic solvent mixture such as a mixture of butyl carbitol and water or without the organic solvent, say, in water only. For instance such wetting and/or other agent(s) can include compounds or compounds such as follows, the percentages of which relate to the base latex paint formulation and are given by weight, and may be considered to be approximate:

| | | |
|---|---|---|
| Pigment dispersing agent | sodium salt of polymeric maleic acid (NaOH stabilized) | 0.1~0.3% |
| Defoamer colloid | sodium polyacrylate | 0.1~0.3% |
| Silicone surfactant | polyether modified poly-dimethyl-siloxane in dipropyleneglycol monomethyl ether (48%) | 0.01~0.1% |
| Paint preservative/ biocide | 1,2-benzisothiazol-3(2H)-one in an aqueous mixture containing 1,2-benzisothiazol-3(2H)-one, sodium hydroxide, and dipropyleneglycol | 0.01~0.05% |
| Rheology modifier | hydrophobically modified ethylene oxide urethane block copolymer in water | 0.25~0.1%. |

Other additive(s) may be employed.

The term, "mold inhibitor," as employed herein is an agent that can kill, control, or prevent growth of mold, mildew, or fungus, and so forth and the like flora, especially when formulated with a basic fire retardant paint. A mold inhibitor may be fire retardant or fire accelerative, but, in the latter case, does not accelerate fire to a degree that the overall composition which contains the mold inhibitor cannot be considered to be a fire retardant composition. Preferably, however, use of the fire retardant paint with mold inhibitor, for example, on a solid material as the substrate, reduces growth of the flora of interest significantly, say, at least about 60%, at least about 85%, or at least about 99% or even at least about 99.9%, if it does not kill it outright, for a significant time, say, at least about thirty days, at least about six months, or at least about 360 days or a year, if not, in effect, indefinitely, as tested by appropriate test methodology. For example, the test method may be by ASTM D5590-94, Determination of Resistance of a Coating Material to Fungal Growth.

As the mold inhibitor, any suitable substance may be employed. Preferably, the mold inhibitor is compatible with the other components, and further is soluble or suspendable therewith. For instance, the mold inhibitor may be a quaternary organic ammonium halide, to include a quaternary alkyl ammonium halide, especially such a halide having at least one short chain and at least one medium chain alkyl group, for example, two of each, and an otherwise corresponding quaternary alkyl aromatic ammonium halide. The short chain alkyl group may be inclusive of, separately at each occurrence, a one- to an about five-carbon group, especially a one- to four-carbon group, for example, a methyl, ethyl, propyl, and so forth group. The medium chain alkyl group may be inclusive of, separately at each occurrence, an about six- to an about thirty-carbon group, especially a six- to an about twenty-carbon group, for example, hexyl, heptyl, octyl, nonyl, decyl, undecyl, dodecyl, a thirteen-, fourteen-, fifteen- or sixteen-, seventeen-, eighteen-, nineteen-, or twenty-carbon group, and so forth. Preferably, the short chain alkyl group is methyl and/or ethyl, especially methyl, and the medium chain alkyl group is an eight- to twelve-carbon group, to include a mixture thereof, especially decyl, which can be present as an n-alkyl group. The halide is advantageously a chloride. For example, the mold inhibitor employed may be didecyldimethylammonium chloride. An aromatic group, to include aryl, alkaryl and/or arylalkyl, for example, a benzyl and/or ethylbenzyl group may be present, for instance, in a quaternary organic to include a quaternary alkyl aromatic ammonium halide mold inhibitor, for example, alkyldimethylbenzylammonium chloride. The mold inhibitor may be a mixture containing more than one mold inhibitor compound. An increase in concentration of any quaternary ammonium halide mold inhibitor may provide for a corresponding reduction in the amount of ammonium phosphate or ammonium orthophosphate.

Tint(s) and/or color(s) may be added to obtain a pastel or colored paint.

The fire retardant paint with mold inhibitor of the invention may penetrate to some degree, say, a small amount. It may reside substantially on the surface of the substrate. However that may be, preferably, once dried, it leaves a generally opaque film on the surface of a flammable solid substrate even though more than one coat may be needed to cover completely. This dried film results in a composition or residue of the same, which is believed to be relatively safe in application and after drying. Suitable precautions, however, should be undertaken. This results also in a versatile fire retardant paint with mold inhibitor, which can be employed in situations in which a painted surface is desired. Advantageously, there is nothing in the formulation of the present invention known to be substantially harmful to wood per se, plywood, any other wood product, or the paper of gypsum board, in general. Further, since the present fire retardant paint with mold inhibitor is typically applied on the surface, it should not interact with, degrade, or otherwise deteriorate plywood, sheathing, other types of glued or composite wood products, or paper-clad or paper products, particularly deep in the substrate.

The present fire retardant paint with mold inhibitor may be applied to the materials by any suitable method. Known methods may be employed. The paint may be applied by spraying, say, by hand-held trigger sprayers, pump-up pressure sprayers, or any other type of manual or automatic power-assisted spraying apparatus, including by power paint rollers (saturated rollers); airless sprayers; brushing; dipping; and so forth. Advantageously, the wet paint is applied by spraying. Brushing is a simple, effective expedient. These and other application processes are well known in the art and are subject to many variations. The fire retardant paint with mold inhibitor of the present invention is applied at any suitable concentration or rate to produce a material treated with an effective amount of fire retardant and mold inhibitor. One may wish to treat all the heavy paper backing on all the drywall (gypsum board) for purposes of enhanced fire resistance and to prevent the growth of mold on this surface, which has been shown to support the growth of mold under conditions conducive to the same and is used extensively in cladding and partitions in residential and commercial building structures.

The following examples further illustrate the invention. Therein, parts and percentages are given by weight, unless otherwise specified.

EXAMPLE 1

In a clean, appropriately sized Cowles mixer, the following component ingredients were added in the order shown to make a base intumescent latex paint, with percentages by weight:

| | |
|---|---|
| Water, bulk | 21.41% |
| TAMOL 731A NaOH stabilized sodium salt of polymeric maleic acid (Rohm and Haas) | 0.16% |
| RHODOLINE 226/35 sodium polyacrylate (Rhodia Canada, Inc.) | 0.10% |

-continued

| | |
|---|---|
| BYK-346 polyether modified poly-dimethyl-siloxane in dipropyleneglycol monomethyl ether (48%) (BYK-Chemie USA, Inc.) | 0.05%. |

Further added under agitation were the following component ingredients:

| | |
|---|---|
| TI-PURE titanium dioxide pigment (DuPont Chemicals) | 7.39% |
| EXOLIT AP 422 ammonium polyphosphate powder (Clariant Canada, Inc.) | 20.69% |
| TECH PE 200 technical pentaerythritol (Hercules Canada, Inc.) | 9.00% |
| Powder melamine (DSM Melamine Americas, Inc.) | 9.47%. |

The mixture was ground for ten minutes, and the bottom and sides of the mixer were scraped. Then added was the following component ingredient:

| | |
|---|---|
| NATRASOL 250 MXR hydroyethylcellulose (Hercules Canada, Inc.) | 0.31%. |

The mixture was ground to a smooth paste to a 2~3 fineness. Then added, with mixing, were the following component ingredients:

| | |
|---|---|
| RHODOLINE 226/35 sodium polyacrylate | 0.10% |
| PROXEL GXL aqueous mixture containining 1,2-benzisothiazol-3(2H)-one, sodium hydroxide, and dipropyleneglycol (Brenntag Canada, Inc.) | 0.03% |
| TEXANOL 2,2,4-trimethyl-1,3-pentanediol monoisubutyrate (Eastman Chemical Company) | 0.75% |
| StanChem 5238 vinyl acetate copolymer emulsion (54-56% polymer/solids, 44-46% water) (StanChem, Inc.) | 21.77% |
| Water, bulk | 6.71% |
| SCOTCHLITE K25 glass bubbles (3M Canada) | 1.52% |
| ACRYSOL RM-8W hydrophobically modified ethylene oxide urethane block copolymer in water (Rohm and Haas) | 0.56%. |

This provided a base intumescent fire retardant latex paint, which was pumped to a storage tank for later filling, or filled into proper containers.

To a sample of the base intumescent fire retardant latex paint was added with stirring 3.0% Mason CS428 alkyldimethylbenzylammonium chloride (80% aqueous solution) (Mason Chemical Co.) which is classified as a surfactant according to its material safety data sheet (MSDS). It contains alkyldimethylbenzylammonium chloride ($C_{12-16}$) (CAS #68424-85-1) (80% by weight); ethanol (CAS #64-17-5) (10% by weight); and water (10% by weight) to provide an intumescent fire retardant latex paint with mold inhibitor.

The finished intumescent fire retardant latex paint with mold inhibitor can be pumped to a storage tank for later filling, or filled into proper containers.

EXAMPLE 2

The base and finished liquid paints of Example 1 were applied to the surface of Douglas fir tongue and groove decking at a rate of 300 square feet per U.S. gallon in two coats, and the painted decking was allowed to dry in a conditioned room at 70 degrees F. and 50% relative humidity until the paints had dried and reached a constant mass. Once dried to constant mass, the decking panels were tested under the ASTM E84 procedure and resulted in respective Flame Spread Ratings of "5" for the base paint and "0" for the finished paint with mold inhibitor.

When untreated Douglas fir decking panels from the same batch of tongue and groove decking were tested under the ASTM E84 procedure to determine the inherent flammability of the panels, the otherwise identical but untreated panels had a flame spread rating of "55."

This serves to demonstrate the effectiveness of the fire retardant properties of the composition of this invention, especially with mold inhibitor.

EXAMPLE 3

The finished paint of Example 1 was applied in a thin layer by brush to the surface of SPF plywood, and subjected to the ASTM D5590-94 test method, employing the mold species known as *Stachybotrys chartarum*. After the required duration of the test, the untreated samples were completely covered with mold growth while the treated samples were mold free. The base intumescent latex paint of Example 1, i.e., without the added Mason CS428 mold inhibitor, similarly applied to the surface of SPF plywood, showed growth rates of "4" (maximum growth after the 30-day duration).

CONCLUSION TO THE INVENTION

The present invention is thus provided. Various features, parts, steps, subcombinations and combinations may be employed with or without reference to other features, parts, steps, subcombinations or combinations in the practice of the invention, and numerous adaptations and modifications can be effected within its spirit, the literal claim scope of which is particularly pointed out as follows:

What is claimed is:

1. A composition of matter comprising an intumescent fire retardant latex paint having a mold inhibitor in an amount sufficient to kill, control, or prevent growth of *Stachybotrys chartarum*, wherein the composition, after it is applied to, and dried and reached a constant mass on a solid, flammable substrate, i.e., after treatment of the substrate, provides for the following:
   a reduction in surface burning characteristics by at least 50% when compared to untreated, solid, flammable substrate as tested by ASTM E84 (Steiner Tunnel Test); and
   a reduction of the growth of the *Stachybotrys chartarum* by at least about 85% for at least about 30 days as tested by ASTM D5590-94 (Determination of Resistance of a Coating Material to Fungal Growth Test).

2. The composition of claim 1, wherein the mold inhibitor is present in an amount by weight of base fire retardant latex paint formulation, i.e., intumescent fire retardant latex paint without the mold inhibitor, of about from 0.1% to 15%.

3. The composition of claim 2, wherein the mold inhibitor is present in an amount by weight of the base fire retardant latex paint formulation of about from 0.5% to 10%.

4. The composition of claim 3, wherein the mold inhibitor is present in an amount by weight of the base fire retardant latex paint formulation of about from 1% to 5%.

5. The composition of claim 4, wherein the mold inhibitor is present in an amount by weight of the base fire retardant latex paint formulation of about from 2% to 4%.

6. The composition of claim 1, wherein the composition has a base fire retardant latex paint formulation, i.e., intumescent fire retardant latex paint without the mold inhibitor, which includes ingredients added with water in approximate percentages by weight as follows:

| | |
|---|---|
| Ammonium phosphate solids | 15~30%; |
| Thermoplastic latex resin | 10~30%; |
| Nitrogenous spumific | 7~13%; |
| Polyol carbonific | 7~13%; |
| Inert inorganic opacifying agent | 5~10%; |
| Glass | 1~5%; |
| Ester alcohol | 0.5~1.5%; |
| Hydroxyalkylcellulosic | 0.1~1%; |
| Wetting and/or other agent(s) | 0.1~2%; | and the mold inhibitor includes a quaternary organic ammonium halide.

7. The composition of claim 6, wherein the thermoplastic latex resin is a polyvinyl acetate type; the nitrogenous spumific includes melamine powder; the inert inorganic opacifying agent includes titanium dioxide; the glass includes a soda lime borosilicate glass; the wetting and/or other agent (s) include at least one of a pigment dispersing agent, a defoamer colloid, a silicone surfactant, a paint preservative/biocide and a rheology modifier; and the quaternary organic ammonium halide includes a quaternary organic ammonium chloride.

8. The composition of claim 7, wherein the mold inhibitor includes a didecyldimethylammonium chloride.

9. The composition of claim 7, wherein the mold inhibitor includes an alkyldimethylbenzylammonium chloride.

10. The composition of claim 7, wherein the base intumescent fire retardant latex paint formulation includes ingredients in approximate percentages by weight as follows:

| | |
|---|---|
| Water (bulk) | 25~33%; |
| Ammonium polyphosphate powder | 20~21%; |
| Vinyl acetate latex (aqueous) | 21~22%; |
| Melamine powder | 9~10%; |
| Polyol of pentaerythritol | 8.5~9.5%; |
| Titanium dioxide powder | 7~8%; |
| Glass bubbles (0.12~0.63 g/cc) | 1~2%; |
| Ester alcohol of 2,2,4-trimethyl-1,3-pentanediol monoisubutyrate | 0.6~0.8%; |
| Hydroxyalkylcellulosic of hydroxyethylcellulose | 0.2~0.4%; |
| Wetting and/or other agents | ~1%. |

11. The composition of claim 10, wherein the mold inhibitor is present in an amount by weight of the base fire retardant latex paint formulation of about from 0.5% to 10%.

12. The composition of claim 11, wherein the mold inhibitor is present in an amount by weight of the base fire retardant latex paint formulation of about from 1% to 5%.

13. The composition of claim 12, wherein the mold inhibitor is present in an amount by weight of the base fire retardant latex paint formulation of about from 2% to 4%.

14. The composition of claim 10, wherein the mold inhibitor includes at least one of a didecyldimethylammonium chloride, an alkyldimethylbenzylammonium chloride, and a combination thereof.

15. The composition of claim 14, wherein the mold inhibitor is present in an amount by weight of the base fire retardant latex paint formulation of about from 1% to 5%.

16. The composition of claim 1, which has ingredients in approximate percentages by weight as follows:

| | |
|---|---|
| Water, bulk | 28.12%; |
| Ammonium polyphosphate powder | 20.69%; |
| Vinyl acetate copolymer emulsion (54-56% polymer/solids, 44-46% water) | 21.77%; |
| Powder melamine | 9.47%; |
| Pentaerythritol | 9.00%; |
| Titanium dioxide pigment powder | 7.39%; |
| Glass bubbles | 1.52%; |
| 2,2,4-Trimethyl-1,3-pentanediol monoisubutyrate | 0.75%; |
| Hydroyethylcellulose | 0.31%; |
| Hydrophobically modified ethylene oxide urethane block copolymer in water | 0.56%; |
| Sodium polyacrylate | 0.20%; |
| NaOH stabilized sodium salt of polymeric maleic acid | 0.16%; |
| Polyether modified poly-dimethyl-siloxane in dipropyleneglycol monomethyl ether (48%) | 0.05%; |
| Aqueous mixture containing 1,2-benzisothiazol-3(2H)-one, sodium hydroxide, and dipropyleneglycol | 0.03%; |
| Alkyldimethylbenzylammonium chloride ($C_{12-16}$) (CAS #68424-85-1) (80% in an aqueous mixture) | 3.0%. |

17. The composition of claim 1, wherein the reduction of the growth of the *Stachybotrys chartarum* is by at least about 99% for at least about 30 days as tested by ASTM D5590-94.

18. In combination, the composition of claim 1, or a residue thereof; and the substrate.

19. The combination of claim 18, wherein the reduction of the growth of the *Stachybotrys chartarum* is by at least about 99% for at least about 30 days as tested by ASTM D5590-94.

20. A method for using an intumescent fire retardant latex paint having mold inhibitor, which comprises steps of:

providing the intumescent fire retardant latex paint having mold inhibitor, wherein the mold inhibitor is present in an amount sufficient to kill, control, or prevent growth of *Stachybotrys chartarum* after the intumescent fire retardant latex paint having mold inhibitor is applied to, and dried and reached a constant mass on the substrate; and contacting the intumescent fire retardant latex paint having mold inhibitor with the substrate to paint it, under conditions sufficient to be flame retardant and mold inhibitory—such that the intumescent fire retardant latex paint having mold inhibitor, after it is applied to, and dried and reached a constant mass on a solid, flammable substrate, i.e., after treatment of the solid, flammable substrate, provides for the following:

a reduction in surface burning characteristics by at least 50% when compared to untreated, solid, flammable substrate as tested by ASTM E84 (Steiner Tunnel Test); and a reduction of the growth of the *Stachybotrys chartarum* by at least about 85% for at least about 30 days as tested by ASTM D5590-94 (Determination of Resistance of a Coating Material to Fungal Growth Test).

* * * * *